INVENTOR
JOSEPH SCHULEIN
BY Kolisch + Hartwell
ATTORNEY

INVENTOR
JOSEPH SCHULEIN

BY Kolisch + Hartwell

ATTORNEY

United States Patent Office 3,439,277

Patented Apr. 15, 1969

3,439,277

RECEIVER APPARATUS FOR DISTINGUISHING A NARROW FREQUENCY BAND FROM A WIDE FREQUENCY BAND CONTAINING THE NARROW BAND

Joseph Schulein, P.O. Box 1825, Vancouver, Wash. 98662

Filed Dec. 27, 1965, Ser. No. 516,337
Int. Cl. H04b 1/10, 1/06
U.S. Cl. 325—474 11 Claims

ABSTRACT OF THE DISCLOSURE

A receiver including a pair of tuned amplifiers, with one tuned to receive and amplify signals within one narrow frequency band, and the other tuned to receive and amplify signals within a different narrow frequency band. The amplifiers, on receiving signals within the respective bands to which they are tuned, produce DC voltages of opposite polarities. An output circuit compares the DC voltages produced by the two amplifiers, and generates an output signal for the receiver on the magnitude of the voltage produced by one of the amplifiers exceeding that produced by the other amplifier.

This invention relates to receiver apparatus, and more particularly to such apparatus which is adapted to distinguish a narrow frequency band from a wider band of frequencies which includes the narrow frequency band.

It is sometimes desirable in electronic apparatus including a receiver to limit the type of signal to which the receiver produces the desired response. More particularly, where a receiver is employed to receive a signal of a predetermined frequency from a known source of signals and to energize a lamp or other indicator on receiving such a signal, it may be desirable to prevent the receiver from energizing the indicator on receiving a signal from some other source comprised of a wide band of frequencies including the aforementioned predetermined frequency. Sparking devices such as vacuum cleaner motors, etc. produce noise signals which are characterized by a wide spectrum of frequencies, substantially all component frequencies in the spectrum of frequencies having substantially the same amplitude. Where a receiver circuit is tuned to receive a signal of one frequency, and to produce a certain operation on receiving such a signal, it is likely that a noise signal of the type described, which contains as a component thereof the same frequency as the frequency to which the receiver is tuned, will actuate the receiver to the same extent as if it had received the signal of one frequency.

An object of the invention, therefore, is to provide novel receiver apparatus which will distinguish between a signal consisting of a predetermined frequency or narrow band of frequencies (referred to hereinafter for simplicity as a "preselected signal") and a signal comprising other frequencies which may include the predetermined frequency (referred to hereinafter for simplicity as an "extraneous signal").

To accomplish such an end, the apparatus features a receiver having a pair of tuned receiver circuits, one of which is tuned to a predetermined frequency (present in a preselected signal), and the other of which is tuned to another frequency which other frequency is likely to be present along with the predetermined frequency in an extraneous signal such as a noise signal. The receiver circuits on being fed signals in their respective tuned frequencies produce different responses, more specifically, DC output voltages of opposite polarities. The output voltages of the two receiver circuits are both fed to an output circuit in the apparatus which output circuit on having a net voltage fed thereinto produces an output voltage which may be used to energize a suitable indicator. When a preselected signal only is received by the receiver, the receiver circuit tuned to the predetermined frequency in this signal produces a DC voltage, and this voltage when fed to the output circuit, causes the output circuit to produce an output voltage. However, when an extraneous signal is received by the receiver containing both the predetermined frequency and the aforementioned other frequency, both receiver circuits produce DC output voltages, and these voltages when added cancel one another, so that no net voltage is applied to the output circuit. As a consequence, no output voltage is produced in the output circuit.

These and other objects and advantages attained by the invention will become more fully apparent when the description which follows is read in conjunction with the accompanying drawings, wherein.

Figure 1:
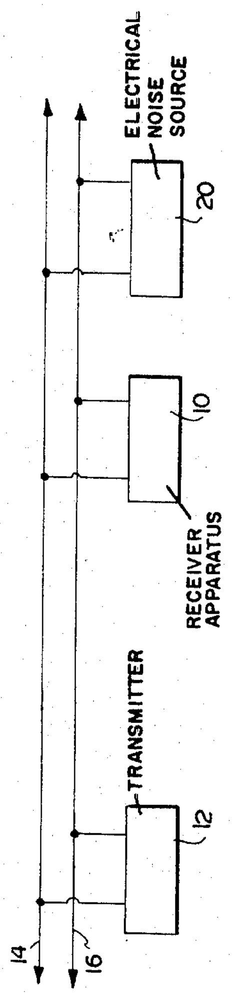
FIG. 1 is a block diagram illustrating an application for receiver apparatus as contemplated herein.

Turning now to the drawings, and with reference first to FIG. 1, shown at 10 is receiver apparatus constructed according to the invention, and at 12 is a transmitter for transmitting signals to the receiver apparatus. The transmitter and receiver apparatus are connected to AC power conductors 14, 16 through which they draw power, and in the arrangement shown, the transmitter transmits signals directly over the power conductors to the receiver apparatus. Transmitter 12 is of the well known type which, when energized, produces and transmits a continuous signal consisting essentially of a single frequency. In the organization contemplated, this signal comprises the preselected signal which is fed to the receiver apparatus.

A source of extraneous or noise signals connected to the supply conductors, is indicated in block form at 20. This source produces a noise signal which is fed to the supply conductors, and which is characterized by including a wide range of frequencies with substantially all frequencies having substantially the same amplitude. The signal produced by this noise source includes a frequency which is the same as the frequency in the preselected signal produced by transmitter 12. As will be explained, receiver apparatus 10 functions to distinguish between the preselected and extraneous signals, and to produce an output voltage only on receiving the preselected signal. This output voltage may, in turn, be employed to energize any suitable indicating device, such as an audio tone generator or a lamp.

Figure 2:
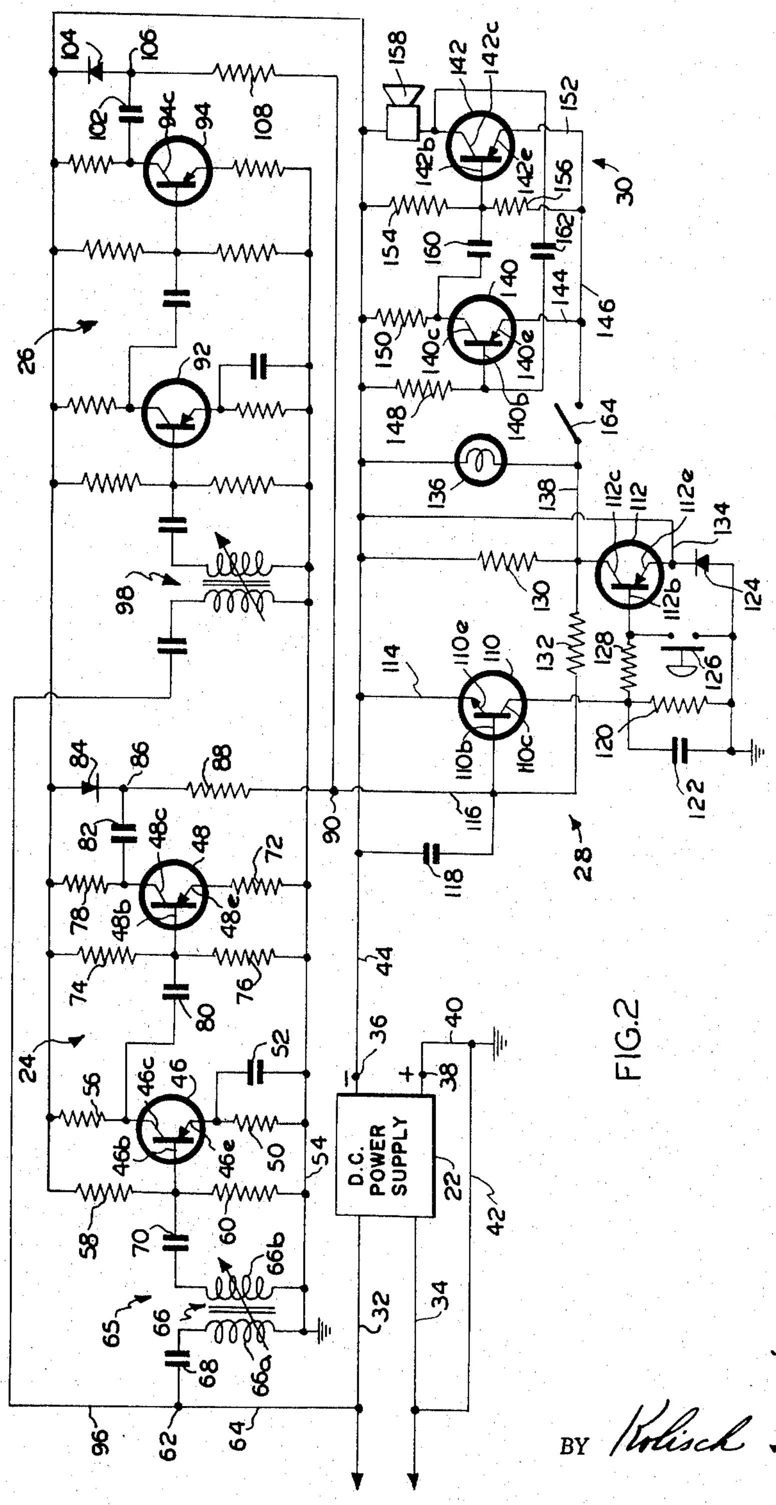
FIG. 2 is a circuit diagram of receiver apparatus constructed according to the invention.

With reference now to FIG. 2 which illustrates the receiver apparatus, the apparatus in general terms comprises a DC power supply 22, first and second tuned receiver circuits 24, 26, respectively, and an output circuit 28. A signal generator 30 is connected to output circuit 28.

The DC power supply is connected to a source of AC power (such as conductors 14, 16 shown in FIG. 1) by a pair of conductors 32, 34. Power supply 22 produces a DC voltage, with the polarity indicated in the drawing, in a pair of power output terminals 36, 38. Terminal 38 and conductor 34 are connected to ground through conductors 40, 42, respectively. DC power is supplied to circuits 24, 26, 28 in the apparatus, and additionally to signal generator 30, through conductor 44 which is connected to output terminal 36.

Receiver 24 comprises a pair of amplifying transistors 46, 48 which are connected in cascade in what is called a common emitter configuration.

Transistor 46 includes an emitter 46e, a base 46b and a collector 46c. The emitter is connected to ground through the parallel combination of a biasing resistor 50 and a by-pass capacitor 52, which elements are connected to ground by a conductor 54. The collector is supplied with negative voltage through a resistor 56 which connects the collector to supply conductor 44. The base is biased by a pair of resistors 58, 60, with resistor 58 connected between the base and supply conductor 44, and resistor 60 connected between the base and conductor 54. Input signals for receiver 24 are provided at a terminal 62, referred to herein as the common input terminal, which is connected to conductor 32 by a conductor 64. Such signals are fed to the base of transistor 46 through a tuned input circuit 65 which comprises a tuneable transformer 66 and a pair of coupling capacitors 68, 70. Capacitor 68 connects the primary winding **66*a* of the transformer to terminal 62, and capacitor 70 connects the secondary winding 66*b* of the transformer to base 46*b*. Transformer 66 is tuned with capacitor 68 to the frequency of the wanted signals, say for example 50 kilocycles, and only signals having this frequency are fed to base 46*b***.

Transistor 48 includes an emitter **48*e*, a base 48*b* and a collector 48*c*. Emitter 48*e* is connected to ground through a resistor 72 and conductor 54; base 48*b* is biased through a pair of biasing resistors 74, 76 which are connected, respectively, from the base to supply conductor 44 and from the base to conductor 54; and collector 48*c* is supplied with negative voltage through a resistor 78 which connects the collector to supply conductor 44. Signals are fed to transistor 48 through a coupling capacitor 80 which connects the collector in transistor 46 to the base in transistor 48, and amplified output signals from transistor 48 are provided at collector 48*c*. These output signals are fed to a rectifying circuit which comprises a capacitor 82 and a diode 84. The capacitor and diode are connected together at a junction 86, with the capacitor connected between this junction and collector 48*c*, and with the diode connected between the junction and supply conductor 44. The diode has its anode connected to the supply conductor and its cathode connected to the junction. Junction 86 is connected through an output resistor 88 to a terminal 90 which is referred to herein as the shared input terminal for output circuit 28**.

Receiver 26 is similar in construction to receiver 24. Thus, in receiver 26 transistors 92, 94 correspond to transistors 46, 48, respectively, in receiver 24. Input signals are fed to receiver 26 from common input terminal 62 through a conductor 96 and a tuned input circuit 98 which corresponds to input circuit 65 in receiver 24, except that circuit 98 is tuned to a different frequency, say for example to a frequency of 65 kilocycles. Amplified output signals from receiver 26 are provided at collector **94*c* in transistor 94, and are supplied to a rectifier circuit which includes a capacitor 102 and a diode 104. The capacitor and diode are connected together at a junction 106, with the capacitor connected between this junction and collector 94*c*, and with the diode connected between the junction and supply conductor 44. The diode has its cathode connected to the supply conductor and its anode connected to the junction. Junction 106 is connected through an output resistor 108 to shared input terminal 90 for the output circuit. Receivers 24, 26** are constructed so that they have substantially the same gain characteristics.

Turning now to the output circuit, this circuit comprises a pair of lock-in transistors 110, 112 having emitters **110*e*, 112*e*, bases 110*b*, 112*b*, and collectors 110*c*, 112*c*, respectively. In transistor 110, the emitter is connected directly to supply conductor 44 by a conductor 114, the base is connected to input terminal 90 by a conductor 116 and to supply conductor 44 through a filter capacitor 118, and the collector is connected to ground through the parallel combination of a resistor 120 and a by-pass capacitor 122. In transistor 112, the emitter is connected to ground through a diode 124 which has its anode connected to ground and its cathode connected to the emitter, the base is connected to ground through a normally open push button reset switch 126 and to collector 110*c* through a resistor 128, and the collector is connected to supply conductor 44 through a resistor 130 and to base 110*b* through a resistor 132. Diode 124 is forward biased by a conductor 134 which connects the cathode of the diode to negative supply conductor 44. An indicator lamp 136 is connected in parallel with resistor 130 with one end of the lamp connected to supply conductor 44 and the other end connected through a conductor 138 to collector 112*c*. The output circuit is referred to as being in an off condition when transistors 110, 112 are nonconductive, and as being in an on condition when the transistors are conductive. When in its on condition, as will be more fully explained, the circuit produces an output voltage across resistor 130**.

With reference now to the signal generator shown, designated at 30, it employs a pair of transistors 140, 142 which function together as an astable multivibrator. The transistors include emitters **140*e*, 142*e*, bases 140*b*, 142*b*, and collectors 140*c*, 142*c*, respectively. In transistor 140, the emitter is connected directly by a conductor 144 to a supply conductor 146, and the base and collector are connected to supply conductor 44 by resistors 148, 150, respectively. In transistor 142, the emitter is connected to conductor 146 by a conductor 152, the base is connected to supply conductors 44, 146 by resistors 154, 156, respectively, and the collector is connected to supply conductor 44 through a suitable loudspeaker 158. Cross-coupling between transistors 140, 142 is provided by capacitors 160, 162, with capacitor 160 connecting collector 140*c* with base 142*b*, and with capacitor 162 connecting collector 142*c* with base 140*b*. Supply conductor 146 is connected through a switch 164 and conductor 138 to the collector in transistor 112. When switch 164 is closed, and a voltage is provided across resistor 130, this voltage energizes the signal generator causing it to produce an audio tone in loudspeaker 158**.

Considering now how the described apparatus operates, and assuming that switch 164 is closed, transistors 46, 48, 92 and 94 in the two receiver circuits are biased so that they are initially somewhat conductive. Transistors 110, 112, in the output circuit and 140, 142 in the signal generator are initially non-conductive. When a wanted signal, contemplated herein as having a single frequency of 50 kilocycles is received at conductor 32, this signal is fed by conductor 64 to common input terminal 62, and from there it is fed to tuned input circuits 65, 98 for receivers 24, 26. Input circuit 98 which is tuned to a frequency of 65 kilocycles, prevents the wanted signal from being fed to transistor 92, but input circuit 65 which is tuned to a frequency of 50 kilocycles, allows the signal to be fed to transistor 46. Thus, the wanted signal is amplified only in receiver 24. Amplifier output signals appearing at collector **48*c* are rectified by diode 84, and produce a positive DC voltage at junction 86. This positive voltage is then applied through output resistor 88 to shared input terminal 90 for the output circuit. Capacitor 118, which is connected by conductor 116 to terminal 90, acts as a filter to reduce pulsing in the voltage at terminal 90**.

The positive voltage at terminal 90 is applied to the base in transistor 110 and causes this transistor to conduct. When transistor 110 conducts, current flows through resistor 120 which is connected to collector **110*c*, and this produces a voltage across resistor 120 which biases transistor 112 into conduction. When transistor 112 conducts, current flows through resistor 130 which is connected to collector 112*c*, and produces a voltage across the resistor which biases transistor 110 and tends to keep transistor 110 conducting. Thus, once transistor 110 is initially made conductive, the output circuit is switched to its on condition, with transistors 110, 112, maintaining one another in conduction. The voltage developed across resistor 130 is applied to indicator lamp 136, whereupon the lamp lights up, and to signal generator 30, whereupon the signal generator is energized to produce a tone in speaker 158**.

When it is desired to switch the output circuit back to its off condition, reset switch 126 is closed momentarily to reduce the bias on base **112*b* by connecting it to ground, and this causes transistor 112 to cease conducting which in turn reduces the voltage drop across resistor 130 substantially to zero and causes transistor 110** to cease conducting.

Explaining what happens when an extraneous signal such as a noise signal is received on conductor 32, such a signal is supplied to tuned input circuits 65, 98. Since a typical noise signal comprises both 50 and 65 kilocycle frequencies, signals will be fed to both receivers, with those at 50 kilocycles feeding into receiver 24 and those at 65 kilocycles feeding into receiver 26. In receiver 24, an amplified output signal appearing at collector **48*c* is rectified by diode 84 and produces a positive DC voltage at junction 86. In receiver 26, an amplified output signal appearing at collector 94*c* is rectified by diode 104, and produces a negative DC voltage at junction 106. Additionally, since the 50 and 65 kilocycle frequencies which are amplified have substantially the same magnitude, as is characteristic of a typical noise signal, and further since the gain characteristics in receivers 24, 26 are substantially the same, the DC voltages produced at junctions 86, 106** have substantially the same magnitudes.

The voltages at junctions 86, 106 are applied to shared input terminal 90 for the output circuit through output resistors 88, 108, respectively, and at this terminal they cancel one another, whereupon no net voltage is available to initiate conduction in transistor 110. Thus, when an extraneous signal is received in the apparatus, such a signal is prevented from causing lamp 136 to light up and signal general 30 to operate.

In the embodiment described, it will be assumed that the transmitter produces a 50 kilocycle signal, which is the preselected signal. In the event that this signal is received simultaneously with an extraneous signal, receiver 24 produces a positive voltage of increased magnitude at junction 86 due to the increase in magnitude of 50 kilocycle signal fed into the receiver. As a consequence the magnitude of the positive voltage produced at junction 86 exceeds the magnitude of the negative voltage produced at junction 106. A net voltage results at terminal 90. This causes the indicator lamp to light up and the signal generator to operate, indicating the reception of the preselected signal.

Figure 3:
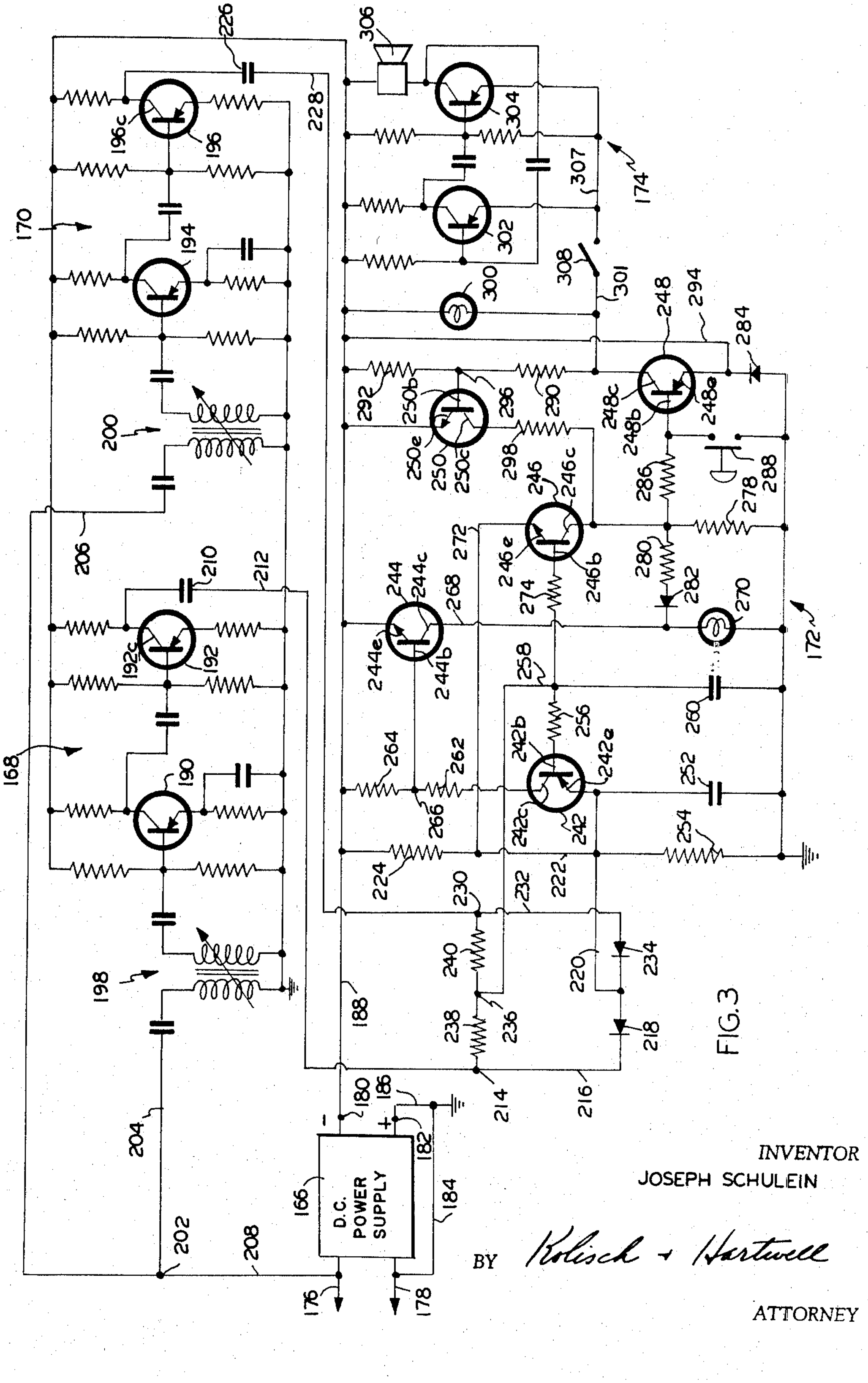
FIG. 3 is a circuit diagram of a modified form of receiver apparatus.

Referring now to FIG. 3, here there is illustrated a modified form of the invention which responds to either one of two preselected signals. The apparatus shown comprises a DC power supply 166, first and second tuned receiver circuits 168, 170, and an output circuit 172. A signal generator 174 is connected to output circuit 172.

The DC power supply is connected by conductors 176, 178 to a source of AC power (such as supply conductor 14, 16 shown in FIG. 1) and the power supply produces a DC output voltage at terminals 180, 182 with the polarity indicated. Conductor 178 and terminal 182 are connected to ground through conductors 184, 186, respectively, and terminal 180 is connected to a supply conductor 188 through which it supplies negative voltage to circuits 168, 170 and 172 in the apparatus, and additionally to signal generator 174.

Receivers 168, 170 are somewhat similar to receivers 24, 26 shown in FIG. 2, with transistors 190, 192 in receiver 168 corresponding to transistors 46, 48 in receiver 24, and with transistors 194, 196 in receiver 170 corresponding to transistors 92, 94 in receiver 26. Receiver 168 has a tuned input circuit shown generally at 198 tuned to a frequency of 50 kilocycles which is similar to tuned input circuit 65 for receiver 24. Receiver 170 has a tuned input circuit shown generally at 200 tuned to a frequency of 65 kilocycles which is similar to input circuit 98 for receiver circuit 26. Input circuits 198, 200 are each connected to a common input terminal 202 by conductors 204, 206, respectively, and the common input terminal is connected to conductor 176 by a conductor 208.

Amplified output signals from receiver 168 appear at collector **192*c* in transistor 192, and from there are fed to a series rectifier circuit which is connected between the collector and supply conductor 188 comprising a capacitor 210 which is connected to collector 192*c*, a conductor 212, a DC output junction 214, a conductor 216, a diode 218, a pair of conductors 220, 222 and a resistor 224 which is connected to supply conductor 188. Amplified output signals from receiver 170 appear at collector 196*c* in transistor 196, and from there are fed to a series rectifier circuit which is connected between collector 196*c* and supply conductor 188 comprising a capacitor 226 which is connected to collector 196*c*, a conductor 228, a DC output junction 230, a conductor 232, a diode 234, conductors 220, 222, and resistor 224. Junctions 214, 230 are connected to a shared input terminal 236 for the output circuit by output resistors 238, 240**, respectively.

Turning now to output circuit 172, this circuit includes input transistors 242, 244, 246, and lock-in transistors 248, 250. Transistor 242 includes an emitter **242*e*, a base 242*b* and a collector 242*c*. Emitter 242*e* is bypassed to ground through a capacitor 252 and is provided with bias voltage by resistors 224, 254, with resistor 224 connected between the emitter and supply conductor 188 and with resistor 254 connected between the emitter and ground. Base 242*b* is connected to input terminal 236 through an input resistor 256 and a conductor 258. The junction between resistor 256 and conductor 258 is connected to ground through a filter capacitor 260. Collector 242*c* is supplied with negative voltage through a pair of resistors 262, 264 which are connected in series between the collector and supply conductor 188**.

Transistor 244 has an emitter **244*e* which is connected directly to supply conductor 188 as shown, a base 244*b* which is connected directly to a junction 266 between series resistors 262, 264, and a collector 244*c* which is connected to ground through a conductor 268 and an indicator lamp 270**.

Transistor 246 has an emitter **246*e* which is connected directly by a conductor 272 to conductor 222 from which it receives bias voltage, a base 246*b* which is connected through an input resistor 274 and conductor 258 to input terminal 236, and a collector 246*c* which is connected to ground through a resistor 278. A series resistor 280 and diode 282 are connected between collector 246*c* and conductor 268** as shown.

Lock-in transistor 248 includes an emitter **248*e* which is connected to ground through a diode 284, a base 248*b* which is connected to collector 246*c* through a resistor 286 and to ground through a normally open push button reset switch 288, and a collector 248*c* which is connected to supply conductor 188 through series resistors 290, 292. The cathode of diode 284 is biased by a conductor 294 which connects the cathode to negative supply conductor 188**.

Lock-in transistor 250 includes an emitter **250*e* which is connected directly to supply conductor 188 as shown, a base 250*b* which is connected to a junction 296 between series resistors 290, 292, and a collector 250*c* which is connected through a resistor 298 to collector 246*c*. An indicator lamp 300 is connected in parallel across resistors 290, 292, with one end of the lamp connected to supply conductor 188 and the other end connected through a conductor 301 to collector 248*c*. Output circuit 172 is referred to as being in an off condition when transistors 248, 250 are nonconductive, and as being in an on condition when these transistors are conductive. When in its on condition, the circuit produces an output voltage across series resistors 290, 292**.

Signal generator 174 is similar to signal generator 30 shown in FIG. 2, with transistors 302, 304 in signal generator 174 corresponding to transistors 140, 142, respectively, in signal generator 30, with loudspeaker 306 corresponding to loudspeaker 158, and with supply conductor 307 corresponding to supply conductor 146. A switch 308 connects the signal generator through conductor 301 to collector 248c in transistor 248. When switch 308 is closed, and a voltage is provided across resistors 290, 292, this voltage energizes the signal generator causing it to produce an audio tone in loudspeaker 306.

Explaining now how the modification shown in FIG. 3 operates, this apparatus is adapted to receive two preselected signals, one of 50 kilocycles and the other of 65 kilocycles, and to distinguish either one of such preselected signals from an extraneous signal such as a noise signal. Initially, transistors 190 to 196 in the receiver circuits are somewhat conductive, while transistors 242 to 250 in the output circuit, and transistors 302, 304 in the signal generator are nonconductive.

If a preselected signal having a frequency of 50 kilocycles is received on conductor 176, this signal is fed to receiver 168 which amplifies the signal and produces a positive DC voltage at output junction 214. The signal is not amplified in receiver 170 since input circuit 200 is adapted to pass only a signal having a frequency of 65 kilocycles. The positive voltage produced at junction 214 is applied through output resistor 238 to input terminal 236 for the lock-in circuit. From there, the voltage is applied to base 242*b*, 246*b* in transistors 242, 246 where it causes transistor 246 to begin conducting. Transistor 242 does not being conducting since it requires a negative voltage applied to its base. With transistor 246 conducting, a current is drawn through resistor 278 which is connected to collector 246*c*, and a voltage is developed across this resistor which biases transistor 248 into conduction. With transistor 248 conducting, a current flows through series resistors 290, 292 developing voltages across these resistors, and the voltage across resistor 292 biases transistor 250 into conduction. When transistor 250 begins conducting, collector current in the transistor flows through resistors 278, 298 producing voltage drops across these resistors, and the voltage drop across resistor 278 tends to keep transistor 248 conducting. Thus, transistors 248, 250 tend to maintain one another in conduction. With these transistors conducting as described, the voltage drop across series resistors 290, 292 is applied to lamp 300 whereupon the lamp lights up, and if switch 308 is closed, is also applied to signal generator 174 whereupon the signal generator is energized and produces a tone in loudspeaker 306. When it is desired to switch the output circuit back to its off condition, reset switch 288 is closed momentarily whereupon the bias on base 248*b* in transistor 248 is reduced by connecting the base to ground, and the transistor ceases conducting. When this happens, transistor 250 also ceases conducting, the voltages across series resistors 290, 292 are reduced substantially to zero, and lamp 300 and signal generator 174 turn off.

When a preselected signal having a frequency of 65 kilocycles is received on conductor 176, this signal is fed to receiver 170 which amplifies the signal and produces a negative DC voltage at output terminal 230. This signal is not amplified in receiver 168 since input circuit 198 is adapted to pass only signals having a frequency of 50 kilocycles. The negative voltage produced at output terminal 230 is applied through output resistor 240 to input terminal 236 for the output circuit. From there, the negative voltage is applied to bases 242*b*, 246*b* in transistors 242, 246, and it causes transistors 242 to begin conducting. Transistor 246 does not conduct since this transistor requires a positive voltage applied to the base. With transistor 242 conducting, a current flows through series resistors 262, 264 and produces a voltage drop across these resistors. The voltage drop across resistor 264 biases transistor 244 into conduction, and when transistor 244 conducts, it draws collector current through indicator lamp 270 and through the series combination of resistors 278, 280 and diode 282. With such current flowing, lamp 270 lights up and a voltage is developed across resistors 278 which biases transistor 248 into conduction. When transistor 248 conducts, it causes transistor 250 to conduct in the manner described above for the apparatus receiving a 50 kilocycle signal. Transistors 248, 250 maintain one another in conduction, and the voltage drop across resistors 290, 292 causes lamp 300 to light up and signal generator 174 to operate.

Considering what happens when an extraneous signal is received on conductor 176, with such a signal typically including components having frequencies of both 50 and 65 kilocycles, and with such components having substantially the same magnitude simultaneously, the 50 kilocycle component is fed into receiver 168 and the 65 kilocycle component is fed into receiver 170. These receivers produce positive and negative DC voltages, respectively, at output junctions 214, 230, with the voltages having substantially the same magnitude. The voltages are supplied by input resistors 238, 240 to terminal 236 where they cancel one another. Thus, there is no net voltage available to cause either transistor 242 or 246 to begin conducting, and hence, neither of the indicator lamps is lit up and the signal generator is not operated.

In the event that a preselected signal of either 50 or 65 kilocycles is received simultaneously with an extraneous signal, the preselected signal produces additional voltage either at junction 214 or at junction 230, depending upon whether it is a 50 or a 65 kilocycle signal, and such additional voltage causes a net voltage (either positive or negative) to appear at terminal 236. If the net voltage is positive it causes transistor 246 to conduct, and thereafter, indicator lamp 300 lights up and the signal generator operates. If the net voltage is negative, then transistor 242 conducts, and thereafter, both indicator lamps 270, 300 light up and the signal generator operates.

Thus, the receiver apparatus contemplated herein will reliably distinguish between a preselected signal having a certain frequency and an extraneous signal including a frequency the same as the preselected signal. The output circuit in the apparatus produces an output voltage which may be used to energize a lamp or a signal generator, or some other suitable indicator, only on the apparatus receiving a preselected signal whether it receives such a signal alone or simultaneously with an extraneous signal. Such an output voltage, however, is not produced when the apparatus receives only an extraneous signal.

In the output circuits shown, the lock-in transistors included therein comprise sustaining means which results in a sustained output signal being produced once the lock-in transistors being conducting. In the event that the voltage which initially turns these lock-in transistors on lasts for a short time only, the transistors, nevertheless, lock each other on, and thus permit the output circuit to produce a sustained output signal. This is an advantageous feature in certain systems such as alarm systems, requiring the sustained operation of a warning indicator.

The apparatus is adapted to receive more than one preselected signal, and although the modification shown herein is adapted to receive only two preselected signals, it should be apparent that further modifications are easily made to facilitate reception of more than such number.

A modification of the apparatus shown in FIG. 2 which might be desirable under certain circumstances, for example where an extraneous signal is likely to include a component frequency the same as a preselected frequency, and this component has a greater amplitude than other component frequencies, would be to increase the gain of receiver 26 (the receiver tuned to the frequency other than the preselected frequency) relative to the gain of receiver 24. This would further assure that no output voltage would be produced by output circuit 28 on the apparatus receiving an extraneous signal.

Other variations and modifications may become apparent to those skilled in the art, and will be possible without departing from the basic principles of the invention, and it is desired to cover all such variations and modifications which come within the scope of the appended claims.

It is claimed and desired to secure by letters patent:

1. Receiver apparatus for distinguishing a narrow frequency band from a wide band including the narrow band comprising a first receiver circuit tuned to receive a narrow frequency band, and operable, on receiving such band, to produce an electrical response of one type, a second receiver circuit tuned to receive another narrow frequency band which is different from said first-mentioned narrow band and within said wide band, and operable, on receiving such band, to produce an electrical response of another type, said second receiver circuit being constructed to produce its electrical response of said other type simultaneously with the production of the electrical response of said one type by said first receiver circuit on both receiving the bands to which they are tuned, and an output circuit connected to said first and second receiver circuits receiving the responses of both of the receiver circuits simultaneously and operable, when the magnitude of the response of one of said circuits bears a predetermined relationship to the magnitude of the response of the other circuit, to produce an output signal for the apparatus.

2. The receiving apparatus of claim 1, wherein the first and second receiver circuits produce responses comprising receiver signals of opposed polarity.

3. The receiving apparatus of claim 2, wherein the output circuit produces an output signal when one of said receiver circuit responses is of greater magnitude than the other.

4. The receiver apparatus of claim 1, wherein said output circuit includes an input which receives the responses produced by both the first and second receiver circuits.

5. The apparatus of claim 1, wherein said output circuit has sustaining means producing a sustained output signal on said output circuit receiving a response.

6. The receiver apparatus of claim 5, wherein said output circuit has an off condition, which it normally assumes, and an on condition to which it is switched when the magnitude of one of said responses bears said predetermined relationship to the magnitude of the other response, and said output circuit produces an output signal when switched to its said on condition.

7. The apparatus of claim 6, wherein said output circuit is connected to a signal generator which it energizes to generate a signal when switched to its on condition.

8. The receiver apparatus of claim 7, where the apparatus is connected to power supply conductors to be supplied with power thereby, and the receiver circuits are supplied a common input signal from at least one of said supply conductors.

9. The receiver apparatus of claim 1, wherein said output circuit produces an output signal only upon the response produced by said first receiver circuit exceeding the response produced by said second receiver circuit.

10. The apparatus of claim 1, wherein the output circuit produces an output signal when one of said receiver responses has a greater magnitude than the other response.

11. Receiver apparatus for distinguishing a narrow frequency band from a wide band including the narrow band comprising a first receiver circuit tuned to receive the narrow frequency band, and operable, on receiving such band, to produce an electrical response having one polarity, a second receiver circuit tuned to receive another narrow frequency band which is different from said first-mentioned narrow band and within said wide band, and operable, on receiving such band, to produce an electrical response having the opposite polarity, and an output circuit connected to said first and second receiver circuits receiving the responses of the receiver circuits and operable, when the magnitude of the response of one of said circuits bears a predetermined relationship to the magnitude of the response of the other circuit, to produce an output signal for the apparatus.

References Cited

UNITED STATES PATENTS

| | | | |
|---|---|---|---|
| 2,743,361 | 4/1956 | Bauman | 325—466 |
| 2,929,921 | 3/1960 | Clark | 325—466 |

KATHLEEN H. CLAFFY, *Primary Examiner.*

R. S. BELL, *Assistant Examiner.*

U.S. Cl. X.R.

325—306, 371